Oct. 1, 1957  F. D. SAWYER ET AL  2,807,991
TRACTOR-IMPLEMENT LINKAGE
Filed March 17, 1952  4 Sheets-Sheet 1
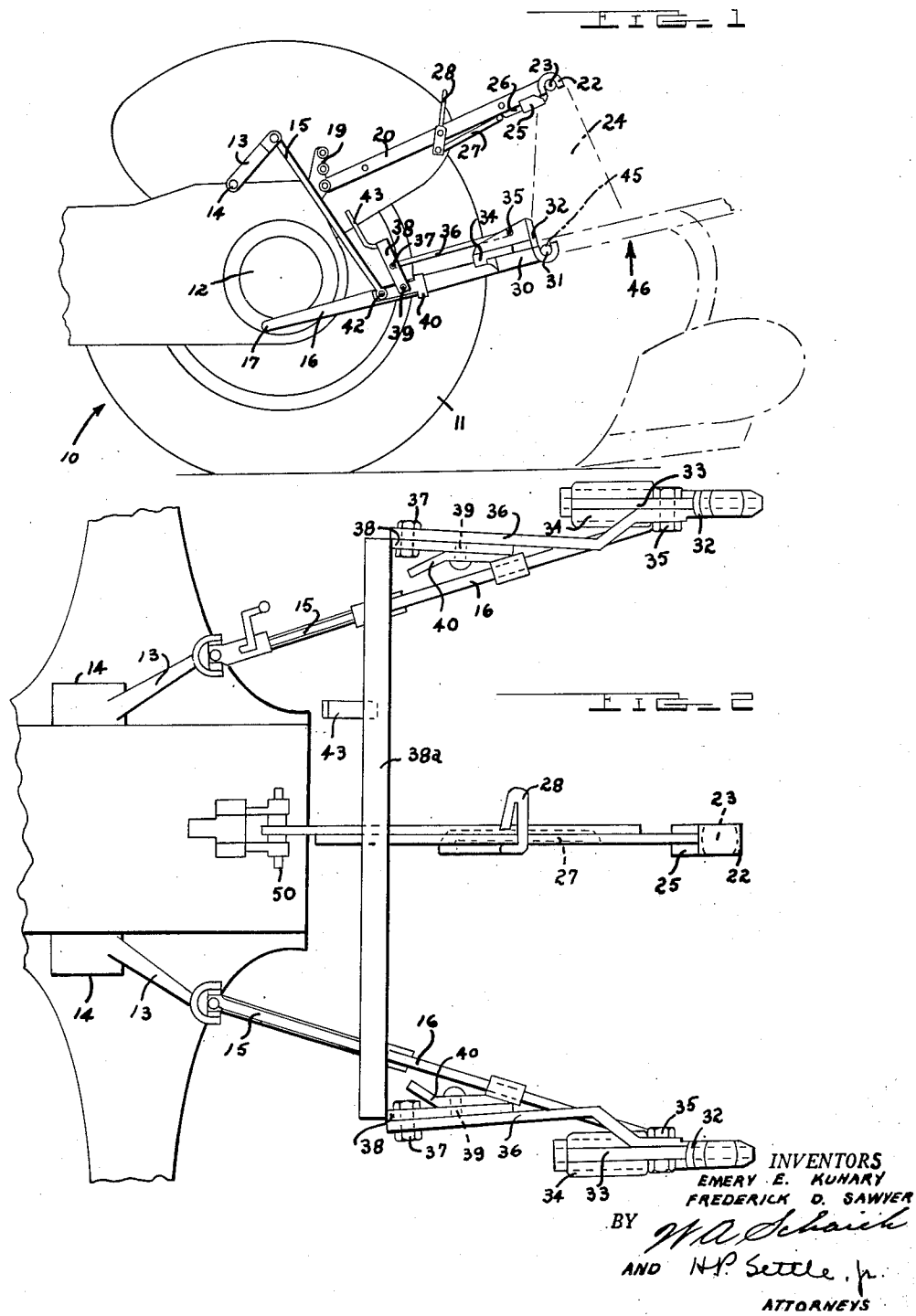
INVENTORS
EMERY E. KUHARY
FREDERICK D. SAWYER
BY
AND
ATTORNEYS Oct. 1, 1957  F. D. SAWYER ET AL  2,807,991
TRACTOR-IMPLEMENT LINKAGE
Filed March 17, 1952  4 Sheets-Sheet 2
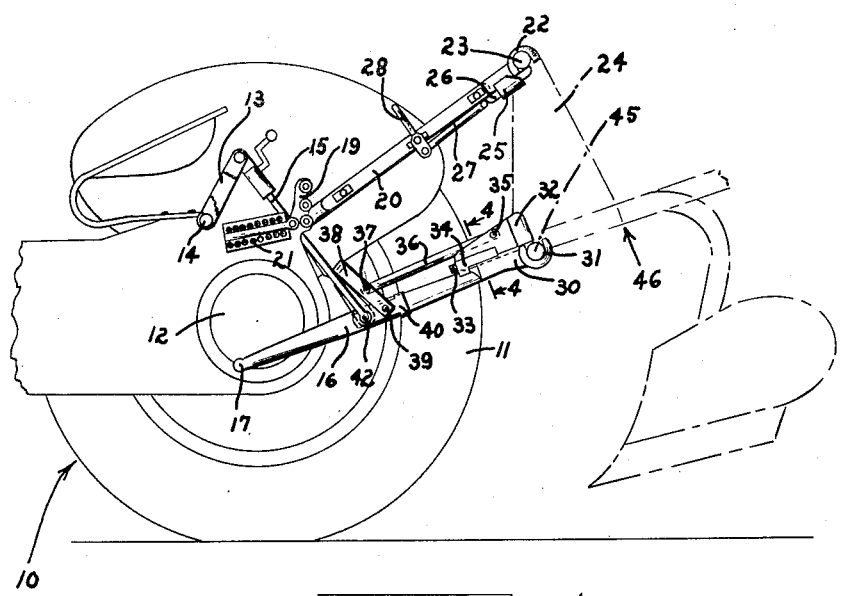
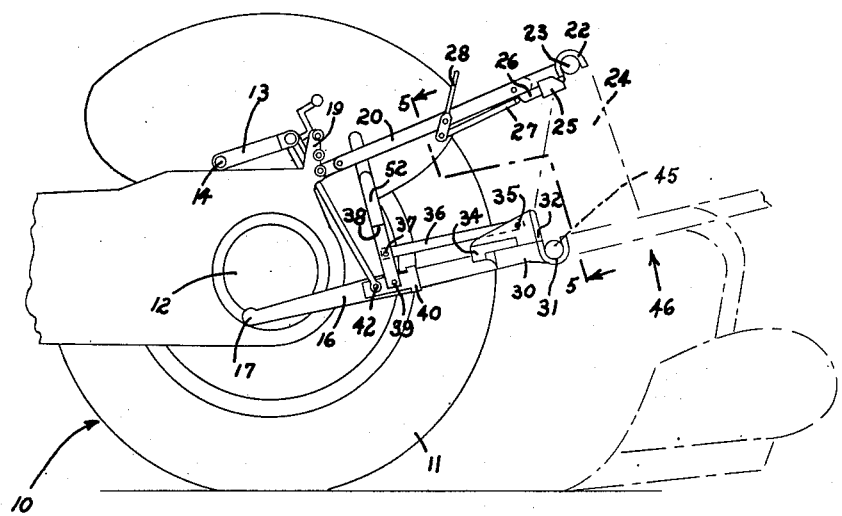
INVENTORS
EMERY E. KUHARY
FREDERICK D. SAWYER
BY
AND
ATTORNEYS

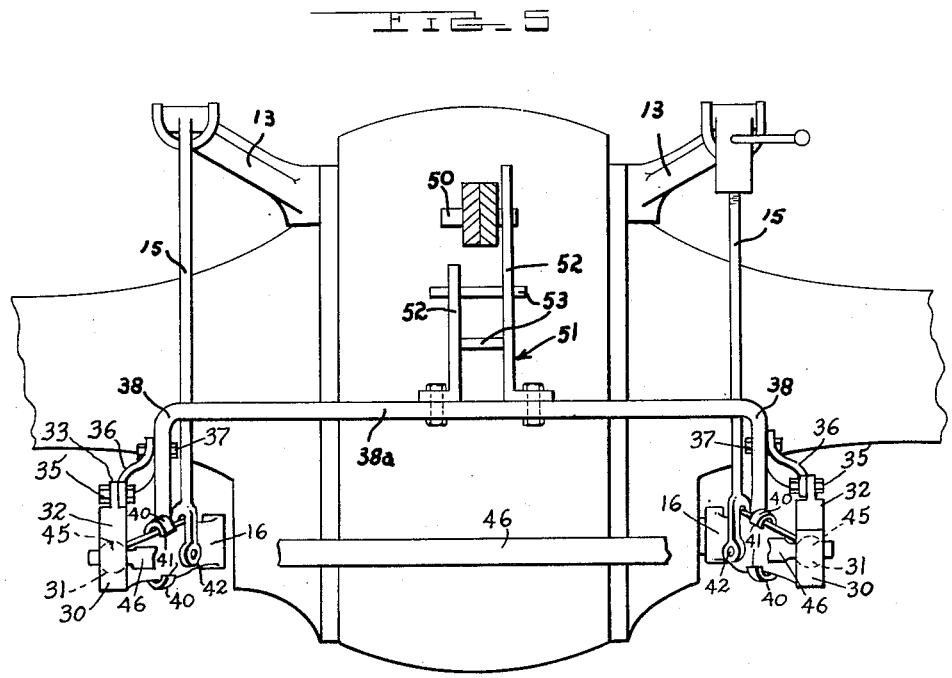
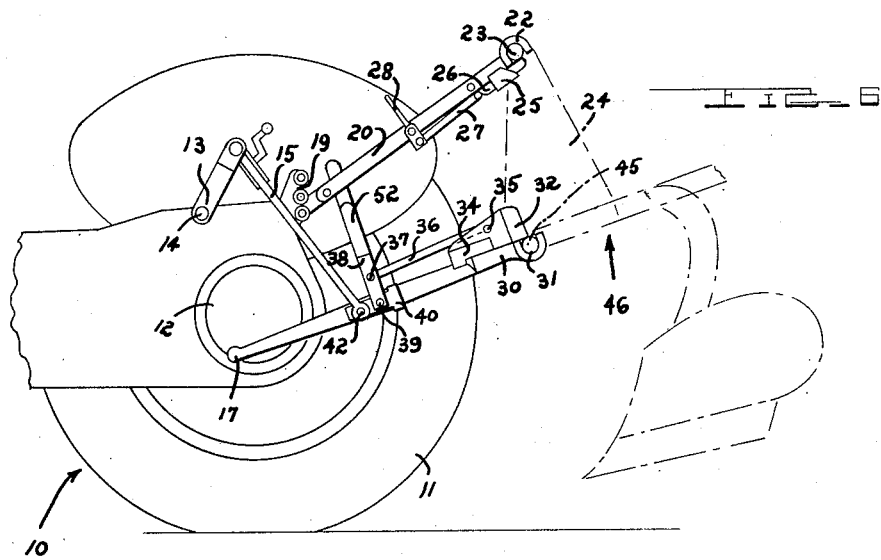

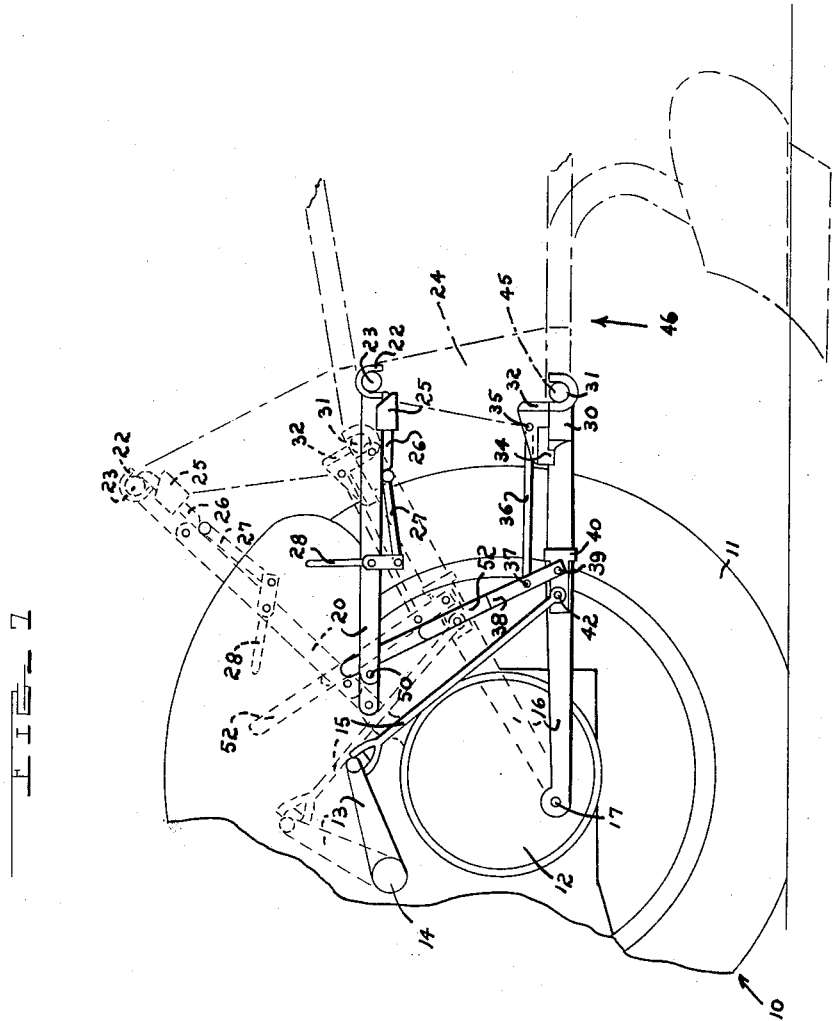

United States Patent Office 2,807,991
Patented Oct. 1, 1957

2,807,991
TRACTOR-IMPLEMENT LINKAGE

Frederick D. Sawyer, Birmingham, and Emery E. Kuhary, Royal Oak, Mich., assignors, by mesne assignments, to Ford Motor Company, Dearborn, Mich., a corporation of Delaware Application March 17, 1952, Serial No. 276,928

9 Claims. (Cl. 97—47.14)

The present invention relates to a tractor-implement linkage and more particularly to such a linkage which is actuatable to connect an implement to a tractor without requiring manual manipulation of the linkage at the implement attachment points.

The present application constitutes a continuation-in-part of our earlier filed pending application, Serial No. 248,058, filed September 24, 1951, now Patent No. 2,691,932, and assigned to the assignee of the present invention.

Our earlier application discloses and claims a hitch linkage generally similar to that of the present invention. The earlier disclosure proposes the use of ball and socket-type attachment means at each link-implement attachment point, the remote control of such attachment means, and the provision of means for adjusting the relative positions of the tractor-carried and the implement-carried attachment elements. These features are also present in the instant invention, so that the attendant advantages are also here obtained.

The present invention possesses further structural and functional advantages. More specifically, the ball and socket-type attachment means at the trailing ends of the lower, power-liftable links are simultaneously actuatable to and from locked position, and, further, the actuation of these attachment means may be automatically effected as a consequence of power elevation of the implement during attachment of the same. Also, the member through which the attachment means are actuated also positions the attachment means at the proper transverse dimension for alignment with the corresponding implement attachment points.

It is, therefore, an important object of the present invention to provide an improved tractor-implement linkage including a plurality of interlocking attachment means simultaneously actuatable to lock the linkage in operative position.

Another important object is the provision of an improved linkage wherein simultaneously actuatable ball and socket-type attachment means are utilized to connect an implement to a tractor-mounted linkage.

It is a further object to provide an improved tractor-implement linkage including ball and socket-type attachment means simultaneously actuatable to detachably lock an implement to the linkage as a consequence of power elevation of the implement by means of the linkage.

Still another object is the provision of a tractor-implement linkage provided with attachment means actuatable upon power elevation of the implement and resiliently spaced transversely for alignment with corresponding implement attachment points.

The specific nature of this invention, as well as other objects and advantages thereof, will become apparent to those skilled in the art from the following detailed description, taken in conjunction with the attached sheets of drawings on which, by way of preferred example only, are illustrated two embodiments of this invention.

On the drawings:

Figure 1 is a side elevational view of a tractor and implement connected by means of a linkage of the present invention, the linkage being illustrated prior to locking of the implement thereto;

Figure 2 is a plan view of the tractor and linkage of Figure 1;

Figure 3 is a view similar to Figure 1 wherein the implement is power elevated by means of the linkage and the linkage is actuated to its locked position;

Figure 4 is a side elevational view similar to Figure 1 illustrating a modified form of linkage of the present invention;

Figure 5 is a sectional view of the linkage and tractor of Figure 4 taken along the plane 5—5 of Figure 4;

Figure 6 is an operated view similar to Figure 3 but illustrating the modified linkage of Figure 4; and Figure 7 is a fragmentary side elevation view illustrating the actuation of the linkage to a closed position upon elevation of the same.

As shown on the drawings:

In Figure 1 reference numeral 10 refers generally to a tractor, such as the well-known Ford tractor, having relatively large rear driving wheels 11, joined by a transversely extending rear axle housing 12. The housing 12 is surmounted by a pair of transversely spaced rock arms 13 pivoted to the rear axle housing, as at 14, and actuatable by a conventional tractor-mounted and tractor-powered hydraulic system. The free ends of the rock arms 13 are pivoted to depending lift links 15 pivotally attached to medial portions of a pair of trailing lower lift links 16 pivotally attached at their forward ends, as at 17, to the tractor rear axle housing. The rear axle housing 12 also carries at its upper portion a control bracket 19 pivotally attached to the rear axle housing and pivoted to the forward end of a trailing top link 20. The bracket 19 re-acts against a relatively heavy control spring 21 mounted upon the rear axle housing and connected to the control mechanism of the tractor hydraulic system. The lower links 16 are power liftable by means of the rock arms 13, while compressive forces exerted upon the bracket 19 by the top link 20 are transmitted to the control spring 21 for actuating the tractor hydraulic system.

The top link 20 is substantially identical with the top link 51 of our above identified co-pending application Serial Number 248,058. The top link 20 is provided with an enlarged boss 22 having an open bottomed, generally U-shaped notch formed therein for receiving a spherical attachment bearing 23 mounted at the upper portions of an implement A-frame 24. Adjacent the boss 22, the top link 20 carries a fixed guide 25 slidably receiving a locking slide 26 actuatable by means of a link 27 and an actuating handle 28 medially pivoted to the top link.

The lower links 16 terminate in an enlarged terminal portion 30 defining an open topped notch 31, the inner surfaces of which are of segmental spherical contour. The notch 31 is closed by a reciprocable locking slide 32 slidably journaled on a slide surface 33 rigidly carried on the links and receiving thereon a slide plate 34. Each slide 32 is pivoted, as at 35, to a forwardly projecting actuating rod 36 extending generally parallel to and above the associated link 16. The forward ends of the actuating rods 36 are each pivotally attached, as at 37, to an arched bail 38 of generally inverted U-shape. The bail 38 is pivoted, as at 39, to a fastening clip 40 having inturned terminal arms 41 (Figure 6) clamped upon the links 16 and projecting forwardly therefrom to be attached to the links by the bolt 42 securing the lift arms 15 to the links 16. It will be appreciated that the bail 38 is pivotable about the pivot points 39 toward and away from the rear end of the lower links 16 and such pivoted movement of the bail will control the opening and closing movement of the slides 32.

The bail 38 may be pivotally actuated in several different ways. For example, the bail is provided, intermediate its transverse dimension, with an upwardly projecting handle 43 adapted to be manually grasped by an operator. In this manner, the bail may be reciprocated and the slide 32 actuated in the desired direction.

Also, the bail may be actuated by its abutment with the lift arms 15. From an inspection of Figures 1 and 3 it will be noted that the upper link 20 and the lower links 16 are pivoted at their free forward ends about vertically spaced axes located on the tractor rear axle housing. During power elevation of the lower links 16, the angular relationship of the upper link relative to the lower links changes rather drastically. Because of this change in angle, the intermediate portion of the bail 38 bridging the space between the lower links 16 will be moved forwardly relative to the lift arms 15, and the link bridging portion 38a will abut the lift arms to be displaced rearwardly thereof during continued link elevation.

In this manner, the bail will be forced rearwardly to actuate the slides 32 so that the same overlie the notches 31 to retain the slides in their position illustrated in Figure 3. As illustrated in Figures 1 and 3, the notch 31 is adapted to receive therein a spherical attachment bearing 45 mounted upon the cross shaft or other frame portion of the implement 46. To attach the implement 46 to the links, it is only necessary to back the tractor toward the implement until the notches 31 at the rear ends of the links underlie the corresponding attachment bearings 45. The bail 38 serves to resiliently retain the links 16 in properly spaced transverse relation to simultaneously receive the attachment bearings 45 upon elevation of the lower links 16, so that the bearings are received by the notches 31. Following the positioning of the attachment bearings 45 within the notches 31, further elevation of the linkage and the implement 46 will cause abutment of the bail 38 with the lift arms 50 to close the slides as aforesaid.

To release the implement 46 from the linkage, it is only necessary to manually grasp the handle 43 and pull the same forwardly when the implement is in its lowered position and further lowering of the linkage after the implement is deposited upon the ground will effect the removal of the bearings 45 from the slide notches 31.

In the modified form of the invention as illustrated in Figure 5, the lower link construction, the upper link construction, and the remainder of the structure are substantially the same as those heretofore described in connection with the embodiment of Figures 1–3 with the exception of the means for actuating the slide 32 upon power elevation of the linkage.

The top link 20 is provided with an elongated attachment bolt 50 which extends transversely beyond each side of the top link as best illustrated in Figure 5. The intermediate or transverse portion 38a of the bail 38 is provided with a centrally located upstanding structure 51 including a pair of transversely spaced upwardly extending side arms 52 and vertically spaced transversely extending reinforcing members 53. The side arms 52 are so positioned as to abut the laterally extending portions of the bolt 50 upon power elevation of the linkage as best illustrated by a comparison of Figures 5 and 7 of the drawings. Due to the change in the relative angularity between the upper and lower links 20 and 16, respectively, upon elevation of the linkage, the longer side arm 52 will abut the bolt 50 and will be forced rearwardly to carry the slide 32 rearwardly to overlie the notches 31 at the trailing ends of the lower links. In this manner the attachment bearings 45 are once again retained within the notches 31 by the slides 32 overlying the upper ends of the notches. To remove the slides 32 from their locking positions, it is only necessary to manually pull the framework 51 forwardly after the implement has been lowered.

The bail 38 develops still another function in that it serves to center the freely laterally swingable draft links 16. The bail is swingable about its points 39 of pivoted attachment in only one plane, i. e., longitudinally of the tractor. Since the bail is rigid in a transverse plane, swinging or lateral movement of the links will torsionally deform the resilient bail, so that the inherent resiliency of the bail will tend to return the links to a centered position.

Thus, it will be appreciated that the present invention provides a new and improved tractor-implement linkage wherein a plurality of implement attachment elements are simultaneously actuated as a consequence of power elevation of the linkage. Also, the bail 38 provides means for transversely spacing and centering the plurality of attachment means for ready alignment with the implement attachment bearings 45. If desired, the attachment means may be simultaneously manually actuated to either attach or detach the implement from the associated linkage elements.

It will, of course, be understood that various details of construction may be varied through a wide range without departing from the principles of this invention and it is, therefore, not the purpose to limit the patent granted hereon otherwise than necessitated by the scope of the appended claims.

We claim:

1. An implement hitch for attaching an implement to a tractor comprising a pair of trailing, power-liftable, laterally spaced hitch links on the tractor, a trailing top link pivotally connected to the tractor in vertically spaced relation to said hitch links, each of said hitch links having an open-topped notch at the trailing end thereof, longitudinally slidable latch elements carried adjacent the trailing ends of said hitch links and actuatable to overlie said notches, and a transversely extending bail having its ends pivoted to medial portions of said hitch links, respectively, and operatively connected to said elements for effecting sliding movement of said latches upon pivoting movement of said bail, and an upstanding projection on said bail engageable with said top link upon power elevation of said hitch links, the differential pivoting movement of said hitch links relative to said top link being effective to actuate said latch elements to closed position.

2. An implement hitch for connecting an implement to a tractor comprising a pair of trailing, power-liftable, laterally spaced hitch links on the tractor, a trailing top link pivotally connected to the tractor in vertically spaced relation to said hitch links, each of said hitch links having an open-topped notch adjacent the free trailing ends thereof, longitudinally slidable latch elements journaled on said hitch links for actuation to overlie said notches, an arched bail having its opposing extremities pivoted to medial portions of said hitch links and its arched central portion extending therebetween, means joining said bail to said latch elements for movement therewith, and means projecting upwardly from said bail central portion for engagement with said top link upon power lifting of said hitch links to actuate said bail for closing said latch elements.

3. An implement hitch for attaching an implement to a tractor comprising a pair of laterally spaced, universally pivoted, trailing hitch links on the tractor, means at the trailing end of each of said links defining an interior socket and including movable members adapted to overlie said sockets, fixed attachment means on said implement insertable into said sockets and latchable therein upon movement of said members, a laterally extending resiliently deformable bail having end portions pivoted to medial portions of said links for movement in a plane longitudinal of said tractor, and means joining said movable members to said bail for actuation upon pivoted movement of said bail, said bail being torsionally deformed upon lateral movement of said links so that the resilient bail tends to return said links to a longitudinally centered position.

4. An implement hitch for attaching an implement to a tractor comprising a pair of laterally spaced, universally pivotal, power-liftable trailing hitch links having open topped recesses at the extreme trailing ends thereof, a latch cover on each of said links actuatable for movement relative to said links to overlie each of said recesses, said recesses being adapted to receive spaced attachment bearings carried by an implement and insertable into said recesses to be retained therein by said latch covers, an arched bail pivotally secured to each of said links and serving to space the same so that said recesses are laterally spaced for substantial longitudinal alignment with said attachment bearings, and interconnecting means joining said bail to said latch covers for co-movement.

5. An implement hitch for attaching an implement to a tractor comprising a pair of laterally spaced, universally pivotal, power-liftable trailing hitch links having open topped recesses at the extreme trailing ends thereof, a latch cover on each of said links actuatable for movement relative to said links to overlie each of said recesses, said recesses being adapted to receive spaced attachment bearings carried by an implement and insertable into said recesses to be retained therein by said latch covers, a laterally extending resiliently extensible and contractible cross-piece secured to each of said links and serving to space the same so that said recesses are laterally spaced for substantial longitudinal alignment with said attachment bearings, and interconnecting means joining said cross-piece to said latch covers for co-movement.

6. An implement hitch for attaching an implement to a tractor comprising a pair of trailing, power-liftable, laterally spaced hitch links on the tractor, an open-topped notch at the trailing ends of each of said hitch links, longitudinally slidable latch elements carried adjacent the trailing ends of said hitch links and actuatable to overlie said notches, and a transversely extending bail having legs respectively pivotally connected to medial portions of said hitch links, the bail laterally spacing said links and being operatively connected to said elements for effecting sliding movement of said elements upon pivoting movement of said bail.

7. An implement hitch for attaching an implement to a tractor comprising a pair of trailing, power-liftable, laterally spaced hitch links on the tractor, an open-topped notch at the trailing ends of each of said hitch links, longitudinally slidable latch elements carried adjacent the trailing ends of said hitch links and actuatable to overlie said notches, a transversely extending bail having its ends pivoted to medial portions of said hitch links, respectively, and operatively connected to said elements for effecting sliding movement of said latches upon pivoting movement of said bail, said bail also serving to laterally space said links, and a handle on said bail for effecting manual actuation thereof.

8. An implement hitch for attaching an implement to a tractor comprising a pair of power actuated rock arms, a pair of trailing, laterally spaced elongated hitch members on the tractor, lift links joining said rock arms to said hitch members, a trailing top link pivotally connected to the tractor in vertically spaced relation to said hitch members, said hitch members each having an open-topped notch at the trailing end thereof, latch elements carried adjacent the trailing ends of said hitch members and actuatable for movement relative to said hitch members to overlie said notches, and a transversely extending bail having its ends pivoted to medial portions of said hitch members, respectively, and operatively connected to said elements for effecting movement of said latch elements upon pivoting movement of said bail, said bail being engageable with one of said links upon power elevation of said hitch members to effect pivoting movement of said bail and closing movement of said latch elements.

9. In a tractor-implement linkage, a pair of laterally spaced trailing draft links adapted for pivoted attachment to a tractor at the link forward ends, said links normally being freely and individually laterally movable, an open sided recess at the rear ends of said links, respectively, a latching mechanism on each link slidable longitudinally thereon for opening and closing the recess, an arched bail extending laterally between and joining medial portions of the links, means mounting the terminal ends of said bail on said links, respectively, for pivoted movement relative thereto, and means joining said bail to each of said latching mechanisms, said bail serving to restrict individual link movement and to laterally space said links at the rear ends thereof, and said bail being movable in a vertical plane to actuate said latching mechanisms and in a lateral plane to concurrently laterally shift said links with the lateral spacing of the link rear ends remaining substantially constant.

References Cited in the file of this patent

UNITED STATES PATENTS

| | | |
|---|---|---|
| 1,348,995 | Himes | Aug. 10, 1920 |
| 2,130,100 | Rasmussen | Sept. 13, 1938 |
| 2,302,842 | Cook | Nov. 24, 1942 |
| 2,413,807 | Warne | Jan. 7, 1947 |
| 2,453,390 | Werner | Nov. 9, 1948 |
| 2,513,783 | Blessinger | July 4, 1950 |
| 2,527,355 | Cook et al. | Oct. 24, 1950 |
| 2,531,768 | Cline et al. | Nov. 20, 1950 |
| 2,577,145 | Nearing et al. | Dec. 4, 1951 |